(12) United States Patent
McKenney

(10) Patent No.: US 6,230,241 B1
(45) Date of Patent: May 8, 2001

(54) APPARATUS AND METHOD FOR TRANSFERRING DATA IN A DATA COMMUNICATIONS DEVICE

(75) Inventor: Bruce P. McKenney, Selkirk, NY (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/150,444

(22) Filed: Sep. 9, 1998

(51) Int. Cl.$^7$ ...................................................... G06F 12/00
(52) U.S. Cl. ............................... 711/118; 711/3; 711/135; 711/165; 710/126; 710/129
(58) Field of Search ................................ 711/3, 118, 135, 711/165; 710/126, 129

(56) References Cited

U.S. PATENT DOCUMENTS

| | | | |
|---|---|---|---|
| 5,247,648 | * | 9/1993 | Watkins et al. ....................... 395/425 |
| 5,915,104 | * | 6/1999 | Miller .................................... 710/129 |
| 6,003,106 | * | 12/1999 | Fields, Jr. et al. ................... 710/129 |

* cited by examiner

*Primary Examiner*—Do Hyun Yoo
*Assistant Examiner*—Mehdi Namazi

(74) *Attorney, Agent, or Firm*—Hamilton, Brook, Smith & Reynolds, PC

(57) ABSTRACT

A computerized method and apparatus transfers data between source and destination memories using a programmed input/output loop executing on a central processing unit which controls a cache memory to perform the data transfer. Blocks of the cache are mapped to respective source and a destination memories, which are preferably I/O memories associated with I/O devices. Cache transfers are done using bursting which allows multiple data units to be returned in response to a single request for data. To perform the transfer of data, a source block in the cache is cleared and multiple memory units are read into the source block in the cache via bursting. A destination block in the cache which is mapped to the destination memory is then cleared and the source block in the cache is written to the destination block in the cache. Finally, the destination block in the cache is flushed out via bursting into the destination memory. The clearing of the source and destination blocks in the cache may be done concurrently with the reading and writing of data blocks. Through the use of the programmed input/output loop and bursting, overall data throughput and transfer rates can exceed throughput rates of a DMA unit configured for a similar transfer. Bursting provides minimal system bus overhead. Preferred embodiments are implemented using the Motorola MPC860 PowerPC microprocessor.

36 Claims, 3 Drawing Sheets

APPARATUS AND METHOD FOR TRANSFERRING DATA IN A DATA COMMUNICATIONS DEVICE

FIELD OF THE INVENTION

The present invention relates to digital data processing and data communications systems. More specifically, the invention relates to the transfer of data between a source and a destination memory within such systems.

BACKGROUND OF THE INVENTION

The internal architecture of a typical digital data processing system includes a system bus for coupling input/output (I/O) devices, such as data ports, terminals, disks, and so forth to/from a central processing unit (CPU) and a memory system. The CPU is responsible for executing programs which control and schedule data transfers over the system bus between the various I/O devices. The memory system is usually segmented into a main memory segment and various I/O memory segments operatively associated with each respective I/O device coupled to the system bus. The main memory stores data and programs that execute on the CPU and each I/O memory buffers data that is transferred to and/or from the I/O device with which the I/O memory is associated. Various mechanisms are used to transfer data between an I/O memory associated with one I/O device to an I/O memory associated with another I/O device.

One such data transfer mechanism is programmed input/output (PIO). PIO is a program executing on the CPU which uses the CPU as the data transfer engine. A PIO data transfer occurs when a router used to route data over a computer network receives data from the network at a source data port device. As the data arrives, the source data port device buffers the data in its associated I/O memory. After the CPU in the router determines the destination for the data, the CPU performs a transfer of the data to a destination data port device. To perform the transfer, the CPU transfers one unit of data at a time from an I/O memory location in the I/O memory associated with the source data port device to an I/O memory location in the I/O memory associated with the destination data port device. This process repeats itself in a PIO-loop until all of the data has been transferred from the source to the destination data port device. The data remains buffered in the I/O memory of the destination data port device until this device can transmit the data out of the router back onto the computer network.

Another mechanism used to transfer data between I/O devices is Direct Memory Access (DMA). DMA uses a specialized microprocessor called a DMA controller. The DMA controller is coupled to the system bus and to the memory system and operates in conjunction with the CPU to transfer data. Once the CPU determines the length and the source and destination locations of the data to be transferred, the CPU configures the DMA controller with this information. Once configured, the DMA controller carries out the memory transfers on the designated block of data without further assistance from the CPU. Data transfers occur by beginning at the start of a source location or block of data and proceed until the specified length of data has been transferred to the destination location. The use of DMA reduces the processing power required by the CPU to perform memory transfers between I/O devices. As such, the CPU can be used for other processing tasks while the data transfer takes place.

In high speed DMA applications, a data transfer technique known as "bursting" is employed. Bursting is a memory access protocol in which a single memory address request (i.e. a single read) is passed to an I/O memory and in response, a predetermined number of memory units are returned. Bursting avoids the need to pass an address for every data unit requested and thus reduces the overhead on the system bus for data transfers. A typical DMA controller that uses bursting can transfer four words of memory using just five cycles. The first cycle specifies the source address from the DMA controller to the I/O memory, and the remaining four cycles are used to return the contents of four units of I/O memory in response to the initial request. Without bursting, at least eight cycles would be needed to transfer four memory units (i.e., one request and one response per unit).

In certain computerized data processing systems, particularly those with high speed CPU's, another memory system called a cache memory or just a "cache" is coupled to the system bus in addition to the aforementioned memory systems. The cache is usually much smaller in capacity than the other memory systems but has very high speed access capabilities. Cache memory is often built into the circuitry of a microprocessor. The built-in nature of cache memory eliminates the need to arbitrate for the system bus when the CPU needs to access memory. Cache memory thus increases processing speeds attainable by the CPU by removing memory and system bus access performance bottlenecks.

Cache memory is used to store data that is frequently and/or repetitively accessed during CPU operation. This is called "caching" the data. For instance, as a router operates, a routing table must be consulted for each data packet that passes through a router to determine where to send the data packet next. The cache can be used to store frequently accessed portions of the routing table. By caching the routing table, the CPU is provided with high speed access to frequently needed routing information and can route packets faster than if access to the primary memory system were required.

Cache memory is often maintained as a mirror image of a portion of main memory and is used with the bursting technique noted above to be updated quickly. That is, the cache memory can have portions which are "mapped" to main memory so that respective portions of the cache and main memory are always more or less in synchronicity with each other. Bursting also allows main memory to be quickly updated with changes made in corresponding mapped portions of the cache. In such cases, high speed reads and writes are performed by the CPU directly to data in the cache, and the corresponding mapped address locations in main memory are later updated by "flushing" the cache to main memory during periods of time when the CPU is idle. In this manner, the cache serves as a high speed buffer for frequently accessed data, and when this data changes, the contents of the cache are "flushed" back to main memory.

Various commercially available microprocessors incorporate CPU logic processing circuitry along with a cache memory unit and a DMA controller all within a single integrated circuit. An example is the Motorola MPC860 PowerPC microcontroller manufactured by Motorola, Inc. of Scottsdale, Ariz. The MPC860 chip provides, among other things, a powerful 32-bit CPU microprocessor in conjunction with a bursting DMA controller and a bursting cache memory system.

SUMMARY OF THE INVENTION

This invention provides an apparatus and method for a computing device using a microprocessor that provides fast and efficient use of system resources for transferring data between two I/O devices. In a preferred embodiment, the microprocessor in a computing device to which this invention may be applied is the Motorola MPC860 PowerPC chip (hereinafter the MPC860 chip). The invention, however, is not limited to computing devices using this chip. The MPC860 chip can be used as the main CPU for controlling data transfers within data processing and computing systems such as routers, switches, hubs, bridges, modem banks, and other such data communications and data processing devices. Such devices using the data transfer concepts described herein are considered to be within the scope of this invention.

We have found that certain inefficiencies exist in current data transfer schemes. Notably, the CPU portion of the MPC860 chip can configure the on-board DMA controller to perform DMA transfers between the I/O memories of two I/O devices that wish to exchange data. When the DMA controller is used in conjunction with bursting, transfers of data between I/O devices occur with minimal system bus usage. However, the DMA controller circuitry within the MPC860 chip has been observed to be relatively slow at performing data transfers between I/O devices, as will be explained.

We have also noted that, while a PIO loop can be programmed into the CPU of the MPC860 chip to perform data transfers one unit at a time from a source I/O memory to a destination I/O memory, no bursting capability is provided in this PIO loop configuration. However, using a PIO loop, the CPU in the MPC860 chip can use its high speed processing power to run a PIO loop to transfer data between two I/O memories faster than the DMA unit configured for a similar transfer of data. This holds true for data blocks (i.e., amounts of data to be transferred) that are of appreciable size.

Though the PIO loop configuration runs faster than the DMA configuration, the PIO loop configuration places heavy demands on the system bus. This is due to the requirement for a data request and a data response to be placed on the system bus for each data unit that is to be transferred. Thus, while the PIO loop configuration runs faster than the DMA configuration due to the high speed of the CPU processor, the system bus is over utilized due to the high overhead associated with the PIO loop. And while the DMA configuration reduces the burden on system bus, ironically, for the MPC860 microprocessor, data throughput is less than the same microprocessor running the PIO loop configuration. This is due to the slower nature of the DMA circuitry, as compared to the high speed circuitry of the CPU.

Accordingly, the invention provides an alternative to the aforementioned configurations. According to one aspect of this invention, cache memory having a cacheable view of I/O memory is employed in conjunction with bursting and a PIO loop to perform data transfers between I/O devices. By using the cache, the invention achieves greater data transfer throughput between a source and one or more destination I/O memories, or between an I/O memory and main memory. By allowing I/O memory to be cached, high speed access to the data is provided. Moreover, by using the bursting capability of the cache, data transfers of up to four words of data at a time take place using a minimal number of cycles, thus minimizing bus usage.

More specifically, the invention provides an apparatus including a source memory unit, a destination memory unit, a cache memory unit, and a system bus interconnecting each of these memory units. A central processing unit is provided that is coupled to the system bus. The central processing unit executes a PIO loop that performs a data transfer method that operates in conjunction with the cache memory unit.

Before the data transfers take place, the central processing unit instructs the cache memory unit to map source and destination locations in the cache memory unit to respective portions of the source and destination memory units in order to configure a cacheable view of the source and destination memory units. This allows data to be bursted to and from the source and destination memory units, which are I/O memory units in a preferred embodiment.

To transfer the data, the PIO loop executing on the central processing unit first instructs the cache memory unit to clear the source location. The PIO loop then instructs the cache to perform a transfer, using bursting, of input/output data from the source memory unit to the source location in the cache memory unit. The PIO loop then clears the destination location in the cache memory unit. Clearing the destination location in the cache may be accomplished by flushing the cache. The PIO loop then instructs the cache to perform a transfer of the input/output data from the source location in the cache memory unit to the destination location in the cache memory unit, and then a transfer of the input/output data from the destination location in the cache memory unit to the destination memory unit. In this manner, data passes through the cache memory unit using bursting to minimize system bus usage, and gains the high speed processing advantages of the CPU executing the PIO loop in conjunction with the cache memory unit. The result is a more efficient and higher speed data transfer method and apparatus.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
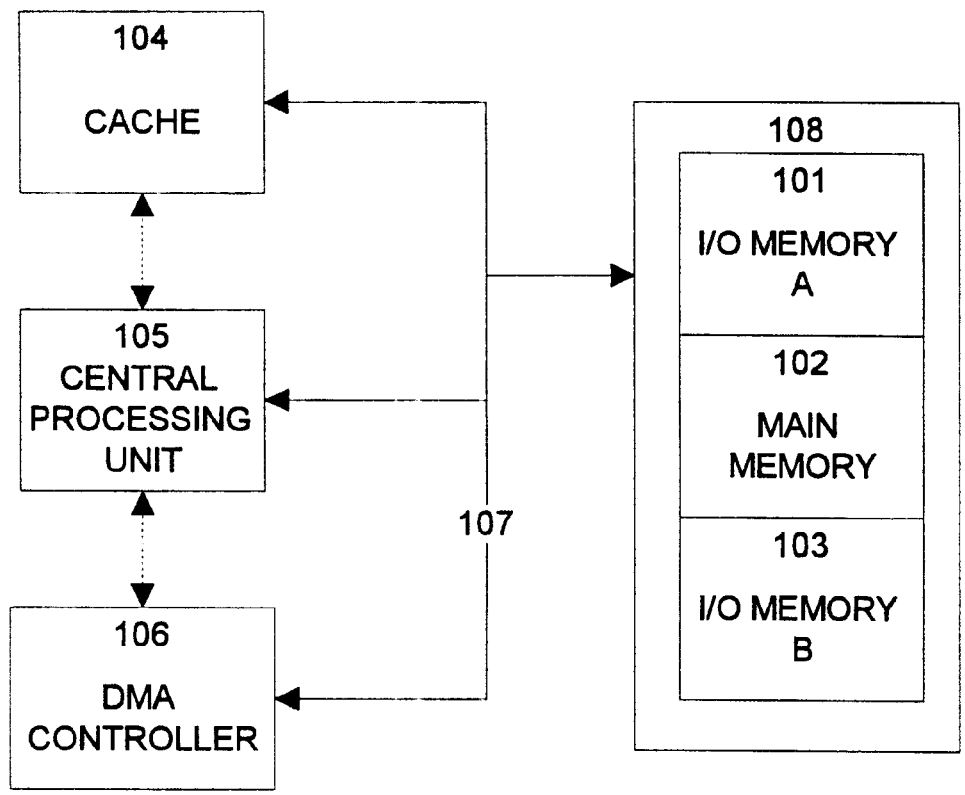
FIG. 1 is a block diagram illustrating a computing device configured according to this invention.

FIG. 1 illustrates an example of the internal architecture of a computing device 100 configured according to the present invention. Computing device 100 includes a system bus 107 which interconnects a cache memory 104 (hereinafter called the cache), a central processing unit (CPU) 105, a DMA controller 106, and a segmented memory system 108 including three memory segments; an I/O memory A 101, a main memory 102 and an I/O memory B 103.

The architecture of computing device 100 is meant to be general in nature for ease of description of this invention.

Computing device 100 may be, for example, a network or data communication device such as a router, hub, switch, bridge, modem, modem bank, or network gateway or proxy server computer or may be another computing device such as a dedicated circuit card, processor or co-processor interfaced to a centralized computing system such as a router backplane, personal computer, workstation, mini-computer or mainframe. It is to be understood that each component 104 through 108 is illustrated as being physically separated from the others for ease of explanation only. In a physical embodiment of FIG. 1, portions of computing device 100, such as the cache 104, DMA controller 106 and the CPU 105 may co-exist on the same physical microchip. In a preferred embodiment, this microchip is the 32-bit word Motorola MPC860 PowerPC (TM) chip manufactured by Motorola, Inc. of Scottsdale, Ariz.

This invention provides a method and apparatus to transfer blocks of data, for example, from I/O memory A 101 to I/O memory B 103 by using a programmed input/output (PIO) loop executing on CPU 105 in conjunction with cache 104. As noted in the summary, a peculiarity of the MPC860 chip is that a PIO loop executing on CPU 105 to perform data transfers can be used to achieve greater throughput than the DMA controller 106 programmed for the same data transfer.

According to a preferred embodiment of the invention, the actual data transfers are performed using the cache 104. On a MPC860 chip, cache 104 includes cache management hardware that supports bursting, allowing four 32-bit words of memory to be transferred in response to a single read or write request. As will be explained in more detail later, in a preferred embodiment, the cache 104 is mapped to respective portions of I/O memory A 101 and I/O memory B 103. This allows I/O data to be cached, even though there is only a single use for the I/O data within the PIO loop.

Generally, caching any data only for a single use and/or caching I/O data are contrary to the conventional wisdom and use of a cache memory system in a computing device. It is generally accepted that I/O data should not be cached due to the fact that I/O data is transitory in nature. That is, I/O data is usually produced by one I/O device and transferred to another I/O device for an immediate, one-time use. Very little repetitive processing occurs with most forms of I/O data. Moreover, if I/O data were to be cached, it suffers coherency problems in that the cached version of the I/O data quickly becomes unsynchronized or obsolete with the corresponding data in the I/O memory from which the cached version originated. That is, cached data is typically maintained in synchronicity with data to which it corresponds in another memory system, such as main memory. Since I/O data is transient and is produced by an I/O device to be quickly transferred to another device, addresses in I/O memory do not maintain the same I/O data for long periods of time.

Data that is typically cached is computational data that is needed for frequent processing or repetitive access, such as the routing table information noted previously. Accordingly, caching single-use transient I/O data in a high speed memory cache 104 is not normally performed. Since cache memory is small and offers high speed, it use is more valuable for frequently accessed data that remains constant for longer periods of time. However, this invention uses the high speed nature of the cache 104 in conjunction with its bursting ability to provide a high speed data channel for transferring I/O data.

Since the cache 104 on a MPC860 chip allows bursting, four words of memory can be transferred into or out of the cache 104 using a single memory read or write request. In a preferred embodiment, the cache 104 is mapped to respective memory blocks of I/O memories A/B 101 and 103. Due to bursting, four words of I/O memory can be read from or written to the cache 104 from an initial single read or write request. The bursting capability of the cache 104 allows the invention to transfer I/O data with minimal use of the system bus 107. By using the cache 104 configured for bursting in conjunction with a PIO loop executing on CPU 105, the invention obtains the benefit of high data throughput due to the high execution speed of the PIO loop and the high speed cache and also provides low bus usage due to bursting.

Figure 2:
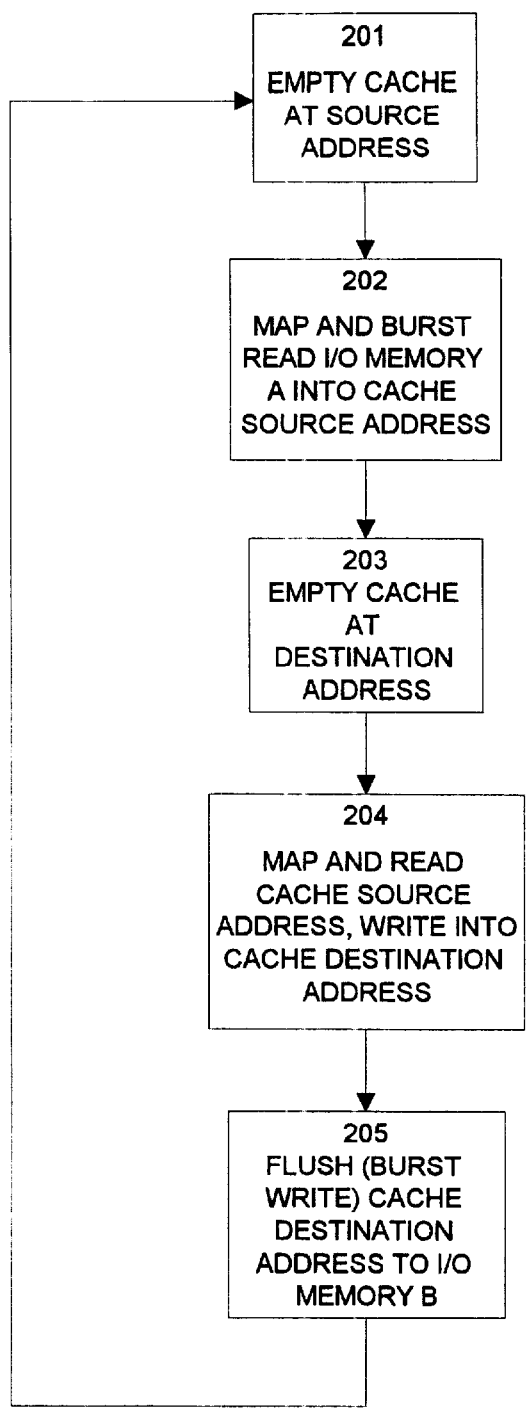
FIG. 2 is a flow chart of the processing steps performing by a computing device configured according to this invention.

FIG. 2 illustrates processing steps 201 through 205 which take place for an example I/O data transfer performed according to a preferred embodiment of the invention. In this example, the data transfer will be explained for I/O data being transferred from I/O memory A 101 to I/O memory B 103. In this example, assume computing device 100 is a router and I/O memory A 101 corresponds to memory that buffers data from packets received by a data port device within the router. I/O memory B 103 corresponds, in this example, to a destination data port device for which the data buffered in I/O memory A 101 is to be transferred.

During the actual data transfer process, cache management hardware within cache 104 establishes a mapping between respective blocks of the cache 104 and blocks in each I/O memory A/B 101, 103. As reads and writes occur to and from cache 104, cache management hardware built into cache 104 is instructed to map respective blocks 210, 211 of cache 104 to blocks 212, 213 of I/O memories A/B 101, 103.

Figure 3:
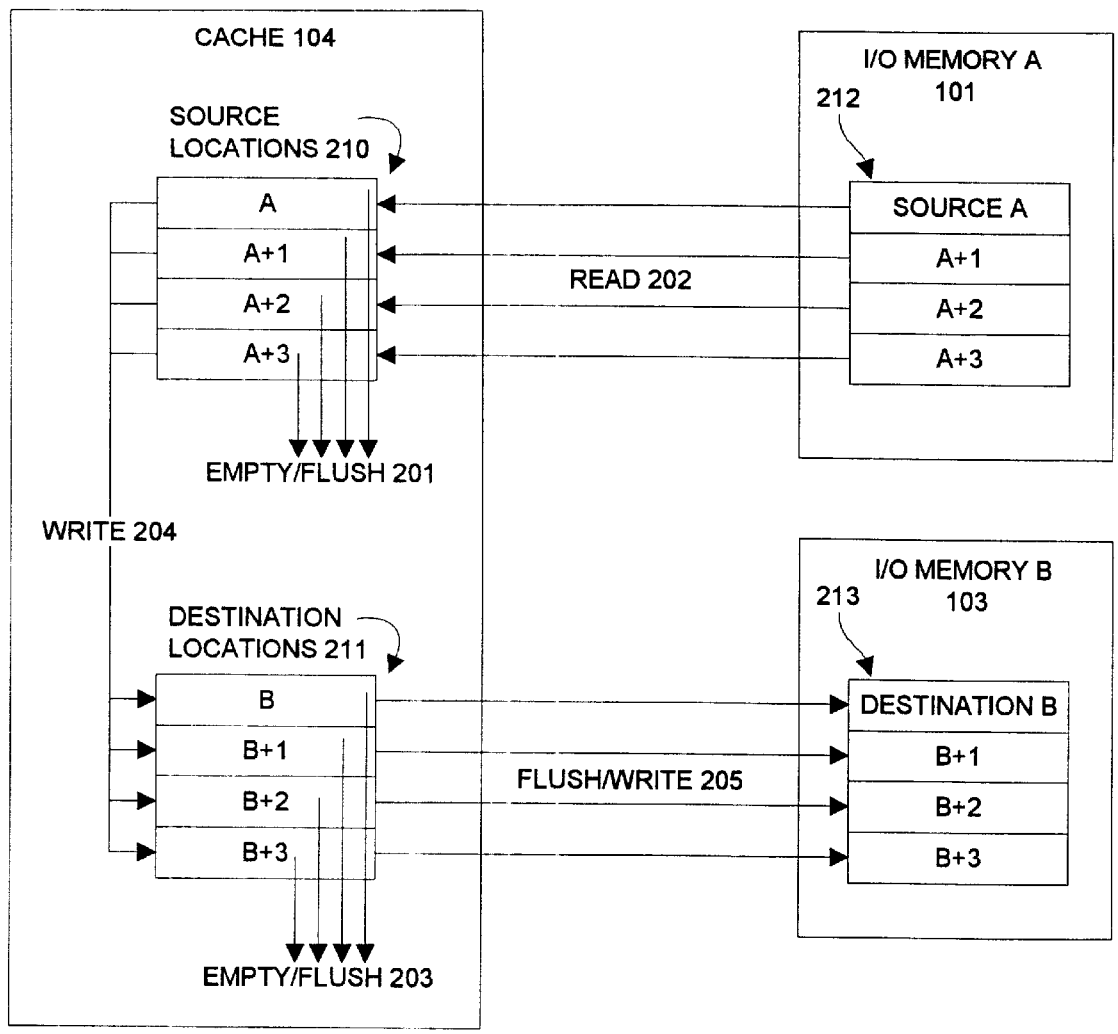
FIG. 3 is an illustration of the flow of data being transferred from a source memory, into the cache, and then on to a destination memory in a computing device configured according to this invention.

FIG. 3 illustrates the cacheable view of I/O memories A/B 101, 103. The cache 104 configures source address A in cache block 210 to map to a corresponding address (memory A address A) within I/O memory block 212. Successive addresses in the cache block 210 occurring after source address A (e.g., A+1, A+2, A+3, and so forth) are also respectively mapped to successive memory addresses (e.g., A+1, A+2, A+3, and so forth) occurring in I/O memory portion 212. A similar mapping is performed between respective cache block 211 in cache 104 and I/O memory block 213. Enough memory addresses are mapped to each other in cache 104 and I/O memories A/B 101, 103 as are needed to perform bursting data transfers. In the preferred embodiment, at least four words in each cache block 210, 211 are mapped to four words in each I/O memory A/B block 212, 213.

Alternatively, the mapping between blocks 210, 212 and 211, 213 can encompass enough mapped memory addresses to cover the entire length or contents of any I/O data that is to be transferred. For example, in this alternative mapping strategy, enough address space is mapped to hold the entire data contents of one data packet.

Steps 201 through 205 comprise the PIO loop that executes on the CPU 105 to control the cache 104 to perform the overall data transfer process. Since the CPU 105 controls the general operation of the cache 104 via the PIO loop, the CPU 105 tracks which memory locations are to be read from and written to. That is, as the PIO loop executes (step 201 through 205) on the CPU 105, appropriate pointers are maintained concerning memory locations indicating the beginning of the data that is read or written at any point in time. The CPU 105 also maintains state information about the source, the destination, and the length of all data being transferred.

In step 201, the CPU 105 instructs the cache 104 to empty the contents of source address block 210 corresponding to (i.e. mapped to) the location of I/O memory A 101 that is to be read. In the preferred embodiment, step 201 causes the cache 104 to clear or flush four words from block 210 to make room for a bursting read. The source location (i.e., clock 210) in the cache 104 is flushed before the read to ensure that whatever data is in the cache at this location is written out to its respective memory location before the data to be transferred is brought in. That is, the clearing step 201 clears the cache 104 source location that is about to be written and prevents the next step 202 from having to worry about the cache contents of block 210. FIG. 3 illustrates the processing of step 201 which empties source addresses A, A+1, A+2 and A+3. The addresses cleared are those that correspond to the next four words of data that will read in the data transfer process.

In step 202, the CPU 105 instructs the cache 104 to perform a burst read of I/O memory A 101 beginning at a specified location. Step 202 causes the cache 104 to first map appropriate addresses between the cache 104 and I/O memory A 101, and step 202 generates a request to load a single word of I/O memory 101 into a corresponding mapped cache address in cache portion 210. The request is sent from cache 104 over system bus 107 to I/O memory A 101. This single request causes the specified word at the requested address to be loaded into source address A of block 210 in cache 104. Since bursting is in effect, the next three words from block 212 of I/O memory A 101 are loaded into block 210 as well. Moreover, since the cache 104 was previously cleared in step 201, step 202 does not need to worry about flushing the contents of block 210. As illustrated in FIG. 3, step 202 causes the data at addresses A, A+1, A+2 and A+3 in I/O memory A 101 to be loaded into cache 104 source addresses A, A+1, A+2 and A+3. Since one read request loads four words into cache 104, the overhead on system bus 107 is minimized.

After step 202 has loaded a block of data into cache 104 from a source memory, the CPU 105, in step 203, prepares the destination block 211 in the cache 104 to receive the data. This is done by instructing the cache 104 to empty the contents of the destination block 211. Again, as in step 201, the contents of block 211 is flushed or cleared so that the next step 204 does not need to be concerned with the contents of block 211 before step 204 performs its transfer, which will be explained shortly. As illustrated in FIG. 3, the contents of destination addresses B, B+1, B+2, and B+3 in portion 211 are cleared of their contents by the processing of step 203.

In step 204, the CPU 105 read the contents of block 210 (i.e., source locations A, A+1, A+2, and A+3), maps a destination block 211, and then writes the data from block 210 into the destination block 211 (i.e., destination locations B, B+1, B+2 and B+3). Since the block 211 was flushed in step 203, step 204 executes quickly since there is no need to worry about any residual data that may be related to another memory location in block 211. As illustrated in FIG. 3, step 204 essentially performs a transfer or copy of data completely within the cache 104. This is a very high speed data transfer.

Finally, to complete the transfer of the data in block 211 of cache 104, in step 205, the CPU 105 instructs the cache 104 to flush block 211 out to I/O memory B 103. As indicated in FIG. 3, step 205 burst flushes the data from block 211 in cache 104 into block 213 of I/O memory B 103. When step 205 is complete, the original I/O data in block 212 of I/O memory A 101 will have been completely transferred to block 213 in I/O memory B 103. In the preferred embodiment, using an MPC860 chip, step 205 can be performed using specialized "flush" instructions designed for the purpose of synchronizing cache 104 with respectively mapped blocks of data in the memory to which it is mapped.

When step 205 is complete, the CPU 105 repeats the PIO loop and processing returns to step 201 to transfer another block of data. The CPU 105 repeats the processing of steps 201 through 205 until all of the required data has been transferred between I/O memory A 101 and I/O memory B 103.

It is important to understand why the cache 104 is cleared before steps 202 and 204. Since each block 210 and 211 in the cache 104 is mapped to a respective block in each I/O memory 101 and 103, as data from I/O memory A makes its way into block 210 in cache 104 (via step 202) and then into block 211 (via step 204), the next portion of the mapped block (210 or 211) is overwritten. Thus, each execution of steps 201 through 205 operates on a sliding window (i.e., a different set of addresses incrementally offset from the former written addresses) of cache memory 104. Each time the cache 104 is written to (i.e, in step 202 and 204), the address written to is offset from the previous address by the amount of data being written. Thus, if addresses A through A+4 are written in step 202, the next time this step is performed on the next pass of the PIO loop, the next five addresses in cache 104 are written.

Next, it is important to note that mapping the cache in steps 202 and 204 does not imply that the cache 104 is cleared of its contents. Thus, data that may exist in the cache 104 may be from another application that used the cache 104. This data in cache 104 may not yet have been synchronized with (i.e., flushed to) a corresponding memory location. Thus, as the PIO loop executes, locations in cache 104 are being written to by steps 202 and 204 that may need to be first synchronized with other memory locations elsewhere in the computing device 100. By providing steps 201 and 203, the flushing and clearing of the cache 104 is ensured to take place before the cache 104 is overwritten. Typically, cache write instructions on microprocessors first check to make sure data that currently exists in the location to be written has been synchronized with memory. However, by requiring the write instruction to do this synchronization check, the write instruction is slowed down considerably. Thus, step 201 and 203 are provided to guarantee that a data synchronization check will not need to be performed in steps 202 and 204.

While the processing of steps 201 through 205 has been described in a serialized manner, in a preferred embodiment certain steps may be performed concurrently with other steps to further speed up the entire data transfer process. More specifically, in a preferred embodiment, steps 201, 203 and 205 are performed while steps 202 and/or 204 are being executed. Thus, the steps of emptying the cache memory 104 locations at block 210 (Step 201) and block 211 (step 203) may be performed concurrently as data is loaded from I/O memory A 101 (Step 202) and as data is copied (Step 204) from block 210 to block 211, respectively. Thus, step 201 and 202 may be started together, and before the data from I/O memory 101 is returned from the read request in step 202, step 201 will have completed clearing and synchronizing the cache 201. Likewise, step 203 and 204 may be started concurrently, and step 203 completes is clearing of the destination locations in block 211 just before the data is transferred to those locations in step 204. Furthermore, step 205, which writes the contents of the destination block 211 into the destination I/O memory 103, can be performed in conjunction with step 203, since emptying (step 203) and flushing (step 204) block 211 can be accomplished at the same time. Concurrent execution in this manner speeds up the PIO loop processing of steps 201 through 205.

In a preferred embodiment, as data is being transferred as explained above, data look ahead is also performed. That is, when steps 201, 203 and 205 execute in parallel with steps 202 and 204, steps 201, 203 and 205 are clearing/flushing data that has already been transferred out of I/O memory 101. Accordingly, step 202 looks ahead and obtains the next block of data to be transferred concurrently as the former block is cleared from the cache 104 and is written to I/O memory B 103. As an example of look ahead, as step 201 clears previously read data from cache memory addresses A, A+1, A+2 and A+3, step 202 is busy looking ahead and reading the next four words of I/O data from I/O memory A 101. By overlapping steps and using look ahead techniques, the CPU 105 can execute the PIO loop step 201 through 205 faster, resulting in higher bandwidth data transfers.

The above described embodiments provide a method and apparatus that performs high speed data transfers between two memory locations. It is to be understood that while the examples given illustrate transfers of data between two I/O memories, the scope of the invention is not limited as such. For example, a source memory may be an I/O memory, as in the former examples, while a destination memory to which the data is transferred may be a main memory (e.g., main memory 102). Thus, the source and/or destination memories are not required to be I/O memories. Likewise, the source memory from which the data is originally read in step 202 may be main memory 102, and the destination memory may be an I/O memory associated with a device, or may be a secondary main memory system serving, for example, as a backup memory system.

In another alternative configuration, there are multiple destinations for the data being transferred. In this configuration, the destination block 211 in cache 104 is mapped to multiple destination memories. For example, data can be transferred according to the processing steps discussed above from I/O memory A 101 into both main memory 102 and into I/O memory B 103. In this configuration, when step 205 flushes the contents of the cache block 211, main memory 102 and I/O memory 103, which are both mapped to the block 211 of cache 104, each receive a copy of the data. In this manner, data transfers may be performed from a single source to multiple destinations while minimizing bus use and providing maximum data throughput. Allowing multiple destinations for data transfers allows computing devices using the invention to accommodate data switching protocols such as the Multicast Protocol, which creates data streams in a network that branch from a single source to multiple destinations.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An apparatus comprising:
a source memory unit;
a destination memory unit;
a cache memory unit;
a system bus interconnecting the source memory unit, the destination memory unit and the cache memory unit; and
a central processing unit coupled to the system bus, having a programmed input/output loop coupled to the cache memory unit, the central processing unit, prior to transferring data, instructing the cache memory unit to map a source location and a destination location in the cache memory unit to respective portions of the source and destination memory units in order to configure a cacheable view of the source and destination memory units, the source and destination locations mapped to respective portions of the source and destination memory units being large enough to accommodate a single bursting memory transfer, the programmed input/output loop performing (i) a transfer of input/output data from the source memory unit to the source location in the cache memory unit, (ii) a transfer of the input/output data from the source location in the cache memory unit to the destination location in the cache memory unit, and (iii) a transfer of the input/output data from the destination location in the cache memory unit to the destination memory unit.

2. The apparatus of claim 1 wherein the transfer of input/output data from the source memory unit the source location in the cache memory unit is performed using bursting, wherein the cache memory unit passes a single request for data over the system bus to the source memory unit, and in response, the source memory unit transfers a plurality of units of input/output data back to the cache memory unit, thus requiring minimal use of the system bus.

3. The apparatus of claim 1 wherein the transfer of the input/output data from the destination location in the cache memory unit to the destination memory unit is performed using bursting, wherein the cache memory unit initiates a single write request for data over the system bus to the destination memory unit, and upon response from the destination memory unit, the cache memory unit transfers a plurality of units of input/output data units to the destination memory unit.

4. The apparatus of claim 1 wherein the programmed input/output loop executing on the central processing unit first clears the source location in the cache memory unit prior to performing the transfer of input/output data from the source memory unit to the source location in the cache memory unit.

5. The apparatus of claim 1 wherein the programmed input/output loop executing on the central processing unit first clears the destination location in the cache memory unit prior to performing the transfer of input/output data from the source location in the cache memory unit to the destination location in the cache memory unit.

6. The apparatus of claim 1 wherein the transfer of data from the destination location in the cache memory unit is performed by flushing the destination of the cache memory unit to the destination memory unit.

7. The apparatus of claim 1 wherein the source and destination locations mapped to respective portions of the source and destination memory units are large enough to accommodate an entire amount of data to be transferred between the source and destination memory units.

8. The apparatus of claim 1, wherein the programmed input/output loop performs the transfers of input/output data from the source memory unit to a source location and from the source location in the cache memory unit to the destination location in the cache memory unit and from the destination location in the cache memory unit to the destination memory unit repetitively, until all data required to be transferred is transferred.

9. The apparatus of claim 1 wherein the apparatus is a network device used for data communications and the source memory unit is associated with an input data device and the destination memory unit is associated with an output data device and the data being transferred is input/output data being communicated by the network device.

10. The apparatus of claim 9, wherein the network device is one of a router, modem, switch, hub, bridge, gateway, modem bank, or carrier card.

11. The apparatus of claim 1, further including:
a secondary destination memory unit coupled to the system bus; and
wherein the programmed input/output loop performs a transfer of the input/output data from the destination location in the cache memory unit to the secondary destination memory unit in addition to the transfer of the input/output data from the destination location in the cache memory unit to the destination memory unit.

12. The apparatus of claim 1 wherein the source memory unit is associated with an input/output device and buffers input/output data to be transferred to the destination memory unit.

13. The apparatus of claim 12, wherein the destination memory unit is associated with an input/output device and accepts data transferred from the input/output device associated with the source memory unit.

14. The apparatus of claim 12, wherein the destination memory unit is a main memory unit and accepts data transferred from the input/output device associated with the source memory unit.

15. The apparatus of claim 1 wherein the cache memory unit and the central processing unit are integrated into a single integrated circuit microprocessor.

16. The apparatus of claim 15 wherein the single integrated circuit microprocessor is the Motorola MPC860 PowerPC series of microprocessor.

17. A computer program product having a computer readable medium having computer program logic encoded thereon for transferring data, the computer program product comprising:
instructions causing a source location in a cache memory unit to be flushed;
instructions causing the cache memory unit to read data from a source memory unit into the source location in the cache memory unit;
instructions causing a destination location in the cache memory unit to be flushed in order to clear the destination location;
instructions causing a transfer of the data from the source location in the cache memory unit to the destination location in the source memory unit;
instructions causing the data to be written from the destination location of the cache memory unit to a destination memory unit; and
instructions, prior to transferring the data, causing the cache memory unit to map the source and destination locations in the cache memory unit to respective portions of the source and destination memory units in order to configure a cacheable view of the source and destination memory units, the source and destination locations mapped to respective portions of the source and destination memory units being large enough to accommodate a single bursting memory transfer.

18. A computer program product of claim 17, further comprising:
instructions to map the source location in the cache memory unit to a respective location in the source memory unit; and
instructions to map the destination location in the cache memory unit to a respective location in the destination memory unit.

19. A method for transferring data associated with an I/O device within a computing system, the method comprising the steps of:
mapping a cache memory unit to have a cacheable view of a source memory unit and a destination memory unit, the cacheable view comprising source and destination locations mapped to respective portions of the source and destination memory units, the source and destination memory units being large enough to accommodate a single bursting memory transfer;
transferring data from the source memory unit to a source location in the cache memory unit;
transferring the data from the source location in the cache memory unit to a destination location in the cache memory unit; and
transferring the data from the destination location in the cache memory unit to the destination memory unit.

20. The method of claim 19 wherein the step of transferring the data from the source memory unit to the source location in the cache memory unit is performed using bursting, wherein the cache memory unit passes a single request for data over the system bus to the source memory unit, and in response, the source memory unit invokes a transfer of a plurality of units of input/output data back to the cache memory unit, thus requiring minimal use of the system bus for memory transfers.

21. The method of claim 19 wherein the step of transferring the data from the destination location in the cache memory unit to the destination memory unit is performed using bursting, wherein the cache memory unit initiates a single write request for data over the system bus to the destination memory unit, and upon response from the destination memory unit, the cache memory unit invokes a transfer of a plurality of units of input/output data to the destination memory unit.

22. The method of claim 19 further including the step of flushing the source location in the cache memory unit, and wherein the step of flushing the source location in the cache memory unit is performed concurrently as the step of transferring data from the source memory unit to a source location in the cache memory unit is initiated.

23. The method of claim 19 further including the step of flushing the destination location in the cache memory unit, and wherein the step of flushing the destination location in the cache memory unit is performed concurrently as the step of transferring input/output data from the source location in the cache memory unit to the destination location in the cache memory unit is initiated.

24. The method of claim 19 wherein the step of transferring the data from the destination location in the cache memory unit to the destination memory unit includes the step of flushing the destination of the cache memory unit to the destination memory unit.

25. The method of claim 19 wherein the steps of transferring data from the source memory unit to a source location and from the source location in the cache memory unit to the destination location in the cache memory unit and from the destination location in the cache memory unit to the destination memory unit are performed repetitively until an amount of data required to be transferred is transferred.

26. A data communications apparatus for transferring data from a source device to a destination device, the apparatus comprising:
a source memory unit coupled to the source device, the source memory unit buffering data originating at the source device;

a destination memory unit coupled to the destination device, the destination memory unit buffering data for use by the destination device;

a cache memory unit;

a system bus interconnecting the source memory unit, the destination memory unit and the cache memory unit; and a central processing unit coupled to the system bus and coupled to the cache memory unit, the central processing unit, prior to transferring data, instructing the cache memory unit to map the source and destination locations in the cache memory unit to respective portions of the source and destination memory units in order to configure a cacheable view of the source and destination memory units, the source and destination locations mapped to respective portions of the source and destination memory units being large enough to accommodate a single bursting memory transfer, the central processing unit controlling the cache memory unit to perform a first transfer of the data buffered in the source memory unit to a source location in the cache memory unit, and then to perform a second transfer of the data from the source location in the cache memory unit to a destination location in the cache memory unit, and then to perform a third transfer of the data from the destination location in the cache memory unit to the destination memory unit, such that the first, second and third transfers of the data result in a high speed transfer of data from the source device to the destination device.

27. The apparatus of claim 26 wherein the central processing unit executes a program comprising a series of instructions which form a programmed input/output loop that when executed on the central processing unit, cause the central processing unit to instruct the cache memory unit to perform the first, second and third transfers of the data in a repetitive manner.

28. The apparatus of claim 27, wherein before the first data transfer is performed, residual data in the source location of the cache memory unit is flushed by the cache memory unit to ensure that any memory associated with the residual data is consistent with the residual data and also allowing the first data transfer to immediately overwrite the contents of the source location without concern for the contents.

29. The apparatus of claim 28, wherein the cache memory unit flushes the residual data in the source location concurrently as the first data transfer is being initiated.

30. The apparatus of claim 27, wherein before the second data transfer is performed, residual data in the destination location of the cache memory unit is flushed to ensure that any memory associated with the residual data is consistent with the residual data and also allowing the second data transfer to immediately overwrite the contents of the destination location without concern the contents.

31. The apparatus of claim 30, wherein the cache memory unit flushes the residual data in the source location concurrently as the second data transfer is being initiated.

32. The apparatus of claim 26, wherein the cache memory unit performs the first and third transfers of data over the system bus using bursting, resulting in a single request for data transfer followed by a data transfer response which includes a plurality of data units, thus resulting in an efficient use of the system bus for the first and third data transfers.

33. The apparatus of claim 26, wherein the central processing unit and the cache memory unit are contained in a single microprocessor allowing the second data transfer to be performed at high speed without using the system bus.

34. A microprocessor apparatus comprising:

a cache memory unit including a source location mapped to receive input/output data from a source and a destination location mapped to store the input/output data to a destination; and a central processing unit coupled to the cache memory unit, the central processing unit, prior to transferring data, instructing the cache memory unit to map the source and destination locations in the cache memory unit to respective portions of the source and destination in order to configure a cacheable view of the source and destination, the source and destination locations mapped to respective portions of the source and destination being large enough to accommodate a single bursting memory transfer, the central processing unit executing instructions that comprise a programmed input/output loop that causes the central processing unit to control the cache memory unit to transfer input/output data from the source into the cache memory unit and then to transfer the input/output data from the cache memory unit to the destination.

35. The microprocessor apparatus of claim 34, further including:

means for flushing the source location in the cache memory unit;

means for reading the input/output data from the source into the source location in the cache memory unit;

means for flushing the destination location in the cache memory unit;

means for writing the input/output data from the source location to the destination location in the cache memory unit; and means for writing the input/output data from the destination location in the cache memory unit to the destination.

36. An apparatus comprising:

a source memory unit;

a destination memory unit;

a cache memory unit;

a system bus interconnecting the source memory unit, the destination memory unit and the cache memory unit; and a central processing unit coupled to the system bus, having a programmed input/output loop coupled to the cache memory unit, the programmed input/output loop performing (i) a transfer of input/output data from the source memory unit to a source location in the cache memory unit, (ii) a transfer of the input/output data from the source location in the cache memory unit to a destination location in the cache memory unit, and (iii) a transfer of the input/output data from the destination location in the cache memory unit to the destination memory unit; and a secondary destination memory unit coupled to the system bus, the programmed input/output loop performing a transfer of the input/output data from the destination location in the cache memory unit to the secondary destination memory unit in addition to the transfer of the input/output data from the destination location in the cache memory unit to the destination memory unit.

* * * * *